United States Patent [19]

Yusa et al.

[11] Patent Number: 4,897,462

[45] Date of Patent: Jan. 30, 1990

[54] PROCESS FOR PRODUCING RUBBER-BASED GRAFT COPOLYMERS

[75] Inventors: Haruhiko Yusa; Mitsuru Hoshino; Haruki Isaka, all of Iwaki, Japan

[73] Assignee: Kureha Kagaku Kogyo Kabushiki Kaisha, Tokyo, Japan

[21] Appl. No.: 364,496

[22] Filed: Jun. 9, 1989

Related U.S. Application Data

[63] Continuation-in-part of Ser. No. 119,030, Oct. 30, 1987, abandoned, which is a continuation of Ser. No. 720,601, Apr. 5, 1985, abandoned.

[30] Foreign Application Priority Data

Apr. 11, 1984 [JP] Japan ................................ 59-72230

[51] Int. Cl.$^4$ ................................................ C08J 3/16
[52] U.S. Cl. ..................................... 528/486; 528/487; 528/488; 528/490; 528/503; 523/352; 525/243
[58] Field of Search ................. 523/335, 352; 525/242, 525/243; 528/486, 487, 488, 490

[56] References Cited

U.S. PATENT DOCUMENTS

| | | | |
|---|---|---|---|
| 3,160,620 | 12/1964 | Petersen | 528/936 X |
| 3,483,174 | 12/1969 | Libergood et al. | 528/486 |
| 3,761,455 | 9/1973 | Tanaka et al. | 528/490 X |
| 3,896,093 | 7/1975 | Valoti et al. | 528/486 X |
| 4,401,806 | 8/1983 | Hagiwara et al. | 528/498 |
| 4,491,658 | 1/1985 | Sugimori et al. | 528/486 |

FOREIGN PATENT DOCUMENTS

| | | | |
|---|---|---|---|
| 0057408 | 11/1982 | European Pat. Off. | 528/936 |
| 1418228 | 12/1975 | United Kingdom | 523/335 |

Primary Examiner—Joseph L. Schofer
Assistant Examiner—F. M. Teskin
Attorney, Agent, or Firm—Wenderoth, Lind & Ponack

[57] ABSTRACT

In a process for producing a rubber-containing graft copolymer, which comprises bringing a latex of a graft copolymer comprising 60% to 90% by weight of a rubbery polymer and 40% to 10% by weight of a hard polymer, said graft copolymer latex being obtained by emulsion polymerizing a hard polymer-forming monomer in a latex of said rubbery polymer and having a minimum film-forming temperature of 75° C. or less, into contact with an aqueous electrolyte solution under stirring, thereby to coagulate the latex, and recovering the precipitated graft copolymer, the improvement is disclosed such that the graft copolymer latex is subjected to slow coagulation so as to allow the graft copolymer to precipitate as substantially spherical particles, wherein the term "slow coagulation" refers to coagulation which proceeds at a milder rate than that of coagulation in which the aqueous electrolyte solution is hydrochloric acid and the pH of the latex during coagulation is 1.8 or less.

5 Claims, 1 Drawing Sheet

PROCESS FOR PRODUCING RUBBER-BASED GRAFT COPOLYMERS

This is a CIP of application Ser. No. 07/119,030, filed Oct. 30, 1987, which in turn is a Continuation Application of application Ser. No. 720,601, filed Apr. 5, 1985, both applications being abandoned in favor of the present application.

BACKGROUND OF THE INVENTION

The present invention relates to a process for producing rubber-based graft copolymers having excellent powder characteristics. More specifically, the invention relates to a process for obtaining rubber-based graft copolymers in the form of substantially spherical fine particles from the latex thereof.

Hard polymers such as vinyl chloride resins, styrene resins, acrylonitrile-styrene resins, methyl methacrylate resins, polycarbonate resins and polyether resins have excellent stiffness, transparency and processability and, therefore, are widely used. However, since these hard polymers are brittle, the blending of a graft copolymer, which is obtained by polymerizing acrylonitrile and styrene or methyl methacrylate and styrene in the presence of a rubbery backbone polymer of the butadiene type, with the hard polymers is generally carried out to improve the impact resistance of the hard polymers. These graft copolymers are remarkably effective for improving the impact resistance of the hard polymers without impairing the inherent properties thereof and, therefore, are widely used.

These graft copolymers are generally prepared by an emulsion polymerization method. The desired graft copolymer is recovered by coagulating the resultant latex. More particularly, a large volume of an aqueous solution of an electrolyte (acid or salt) is poured into the latex, or conversely, the latex is poured into a large volume of the above-mentioned aqueous solution, to completely coagulate the latex, thereby forming a slurry. Then the slurry is dewatered and dried to obtain a graft copolymer in the form of a powdery resin.

The powder obtained by this method is, however, disadvantageous in that the constituent particles are irregular in shape and control of the particle size distribution is difficult. Furthermore, the powder contains a large amount of fine particles. As a result, the working environment becomes poor because of the dust, and the danger of dust explosion is increased. Furthermore, difficulties in handling the powder, such as a blocking phenomenon in which the powder particles adhere to each other during storage and process difficulty due to the poor fluidity of the powder, are liable to occur. Therefore, at the present time when reduction in labor is being sought by automation of powder weight measurement and the adoption of a large scale transportation system, there is a great demand for improvements in the powder characteristics, typically blocking resistance, fluidity and bulk density, with regard also to rubber-containing graft copolymers.

SUMMARY OF THE INVENTION

An object of the present invention is to solve the above-mentioned problems, and the present invention contemplates attaining this object by subjecting a specific rubber-containing graft copolymer latex to slow coagulation.

The process for producing a rubber-based copolymer according to the present invention comprises bringing a latex of a graft copolymer comprising 60% to 90% by weight of a rubbery polymer and 40% to 10% by weight of a hard polymer, the graft copolymer latex being obtained by emulsion polymerizing a hard polymer-forming monomer in a latex of said rubbery polymer, and having a minimum film-forming temperature of 75° C. or lower, into contact with an aqueous electrolyte solution under stirring, so as to coagulate the latex, and recovering the precipitated graft copolymer, characterized in that said graft copolymer latex is subjected to slow coagulation so as to allow the graft copolymer to precipitate as substantially spherical particles, wherein the term "slow coagulation" refers to coagulation which proceeds at a milder rate than that of coagulation in which the aqueous electrolyte solution is hydrochloric acid and the pH of the latex during coagulation is 1.8 or less.

Thus, the present invention has succeeded in obtaining graft copolymers in the form of fine particles having excellent particle characteristics by satisfying the two requirements, namely, that the rubber-containing graft copolymer should have minimum film-forming temperature of 75° C. or less and that the coagulation should be slow coagulation, in the coagulation of the graft copolymer with the addition of an electrolyte.

We have found that, when a latex of the specific graft copolymer is subjected to slow coagulation, the coagulated particles are of a substantially spherical shape and retain this shape in the subsequent steps of operation. The resultant spherical particles have a sharp particle size distribution and contain only a very small amount of coarse particles or very fine particles. Therefore, the slurry derived from these particles exhibits good dewatering property and dryability and at the same time exhibits high bulk density and excellent fluidity and blocking resistance.

Figure 1:
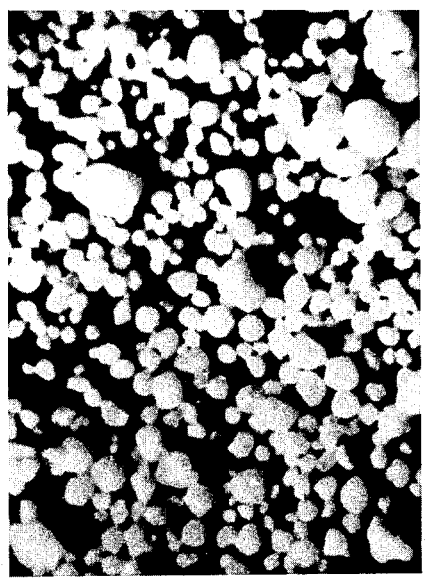
FIG. 1 is a photomicrograph of substantially spherical particles of a rubber-containing graft copolymer coagulated according to the process of this invention.

The magnification of these photomicrographs is approximately 25.

DETAILED DESCRIPTION OF THE INVENTION

Throughout this disclosure, quantities expressed in percent (%) and "parts" are by weight.

Graft Copolymer Latex

Graft Copolymer

The graft copolymer comprised in the latex to be subjected to slow coagulation according to the present invention is prepared by emulsion polymerizing a hard polymer-forming monomer in a latex of a rubbery polymer and comprises 60% to 90% of the rubbery polymer and 40% to 10% of the hard polymer produced from the monomer. The material called "graft copolymer" in the present invention is intended to include a mixture of a material consisting of the rubbery copolymer to which the hard polymer component is grafted and the hard polymer not grafted thereto, in addition to a material consisting of the rubbery copolymer to which the hard polymer component is completely grafted. This is the reason why the graft copolymer is herein specified in terms of the production process.

The rubbery polymers to be the backbone or "trunk" polymer of such a graft copolymer include, for example, homopolymers of dienes such as butadiene, isoprene and chloroprene and alkyl esters of acrylic acid having 4 to 10 carbon atoms in the alkyl group such as butyl acrylate and octyl acrylate, and copolymers thereof with monomers copolymerizable therewith. The copolymerizable monomers include, for example, (A) aromatic vinyls such as styrene and α-methylstyrene; (B) alkyl esters of methacrylic acid (especially, $C_1$–$C_4$ lower alkyl esters) such as methyl methacrylate and ethyl methacrylate; (C) alkyl esters of acrylic acid having 1 to 8 carbon atoms in the alkyl group such as methyl acrylate and ethyl acrylate and (D) vinyl cyanide compounds such as acrylonitrile and methacrylonitrile. The rubbery polymer may or may not be crosslinked. If necessary, the rubbery polymers can be used in any mixture thereof.

On the other hand, the hard polymer-forming monomers to constitute the "branch" polymer of the graft copolymer include, for example, (A) aromatic vinyls such as styrene and α-methylstyrene, (B) alkyl esters of methacrylic acid (especially, $C_1$–$C_6$ alkyl esters) such as methyl methacrylate, ethyl methacrylate and butyl methacrylate; (C) alkyl esters of acrylic acid (especially, $C_1$–$C_6$ alkyl esters) such as methyl acrylate, ethyl acrylate and butyl acrylate; (D) vinyl cyanide compounds such as acrylonitrile and methacrylonitrile; and (E) vinyl halides such as vinyl chloride and vinyl bromide. These monomers are used singly or as a mixture thereof. The hard polymer composed of such monomers may or may not be crosslinked.

The general method for preparing the rubber-based graft copolymer comprising the above-mentioned rubbery polymer and the above-mentioned hard polymer is described in detail in Japanese Patent Publication (Examined) Nos. 45-22629, 46-31462, 49-18621, 50-40142 and 52-3667, to which the present invention, however, is by no means limited.

The coagulatability of the graft copolymer latex is generally depends to a remarkable extent upon the type and amount of the emulsifier used. The emulsifiers for the graft copolymer latex used in the present invention are preferably fatty acid salts or anionic emulsifiers comprising, as the main component, a fatty acid salt. The emulsifier is usually used in an amount of 3.0 parts or less based on 100 parts of the solid content of the latex. The fatty acid salts include alkali salts of oleic acid, stearic acid and linoleic acid. The anionic emulsifiers used together with the fatty acid salts are those which are stable to acids, such as salts of higher alcohol sulfuric acid esters, alkylbenzenesulfonic acid salts and alkylphosphoric acid salts. The anionic emulsifier is used in an amount of 50% or less, preferably 20% or less, based on the total amount of the emulsifiers.

The coagulatability of the graft copolymer latex generally depends upon the solids concentration, particle size and pH of the latex. The graft copolymer latex used in the present invention preferably has a solids concentration of 15% to 50%, an average particle diameter of the latex particle of 0.05 to 1.0 μm and a pH of 7 to 10.

The graft copolymers thus prepared and known in the art may include, for example, MBS resins (methyl methacrylate-butadiene-styrene), ABS resins (acrylonitrile-butadiene-styrene), ABSM resins (acrylonitrile-butadiene-styrene-methyl methacrylate) and AAS resins (alkylester of acrylic acid-acrylonitrile-styrene). It is to be noted that the graft copolymer usable for the present invention is such that the minimum filmforming temperature of the latex thereof is 75° C. or lower.

The graft copolymer latex of the present invention should have a minimum film-forming temperature of 75° C. or lower, preferably 70° C. or lower. The minimum film-forming temperature of the latex of the present invention is determined by using a film-forming temperature testing device type I manufactured by Yoshimitsu Scientific Machine Co., Ltd., Japan, according to ASTMD-2354-65T.

If the minimum film-forming temperature of the latex is higher than 75° C., the powder obtained by the coagulation process of the present invention is in the form of substantially spherical particles, but the bulk density thereof is remarkably low. Furthermore, when the powder is dewatered after the coagulation, much energy is necessary for drying because of the high water content of the cake. This is because the granulation process of the present invention proceeds while being accompanied by the coalescence or fusion of the fine particles, with the result that a significant amount of water is occluded in the particles during the course of growth of the particles. Therefore, it is considered that for the latex having a minimum film-forming temperature higher than 75° C., densification does not readily occur in the interior of the particles during the heat treatment, dewatering and drying processes due to the small force of fusion between the fine particles.

On the other hand, when the latex has a minimum film-forming temperature of 75° C. or lower, densification easily occurs in the interior of the particles during the heat treatment, dewatering and drying processes subsequent to the coagulation, and the internal water included in the particles is removed with the progress of densification, with the result that the water content of the cake before drying is controlled to a low level and it becomes easy to obtain powder having a high bulk density. Therefore, the effects of the present invention are attained only by slow coagulation of the latex having a minimum film-forming temperature of 75° C. or lower.

The minimum film-forming temperature of the graft copolymer latex has a tendency to decrease with the increase in the content of the rubbery backbone polymer constituting the graft copolymer. Furthermore, this minimum film-forming temperature also depends upon the composition of the hard polymer constituting the graft copolymer. That is, in the case where the hard polymer contains a polymer component providing a relatively low glass transition temperature, such as alkyl acrylates, e.g., ethyl acrylate and butyl acrylate, the minimum film-forming temperature is lower even if the rubbery polymer content of the graft copolymer is the same. In addition, the minimum film-forming temperature depends upon the pH and surface tension of the latex, the degree of crosslinking of the backbone polymer and/or branch polymer, the addition of a plasticizer, and the like.

Slow Coagulation

The above described graft copolymer latex is coagulated by being brought into contact with an aqueous electrolyte solution, whereby the graft copolymer is precipitated. The coagulation is usually carried out under stirring. A feature of the present invention resides in the fact that the coagulation of the latex is carried out at a mild rate of coagulation, i.e., slow coagulation is carried out.

The term "slow coagulation" used herein is in contrast to the conventional coagulation method. The conventional coagulation method comprises coagulating completely the latex at a high rate of coagulation with the use of an acid or salt in a high concentration. The slow coagulation refers to the coagulating conditions under which the coagulation proceeds at a milder rate of coagulation than that of the conventional coagulating method, and the latex mildly loses its stability after contact with an aqueous electrolyte solution, the coagulated fine particles repeatedly coalescing with each other due to their force of fusion while they diffuse through the coagulating system, so as to grow into substantially spherical particles.

In accordance with the present invention, in defining the slow coagulation, a coagulation method in which the aqueous electrolyte solution is hydrochloric acid and the pH of the latex during coagulation is 1.8 or less is adopted as the conventional coagulating method to be contrasted. As a coagulation method equivalent to "the standard method", there may be mentioned a case where inorganic or organic acids other than hydrochloric acid are used and a case where inorganic or organic salts containing mono-, di- or tri-valent cations are used in a high concentration, i.e., the concentration of the salts in the latex during coagulation is 0.8 mole/liter or more when the cation is monovalent. These cases are all referred to as "rapid coagulation" in contrast to the "slow coagulation" resorted to in the present invention.

For the slow coagulation, the type of the electrolyte as the coagulating agent, the concentration of the aqueous electrolyte solution, the mixing proportions of the latex and the aqueous electrolyte solution, and the like should be appropriately selected according to the coagulatability of the latex. Furthermore, in order to adjust the particle size distribution thereby recovering the graft copolymer consisting mainly of substantially spherical particles having only a small amount of fine powder, it is necessary that the temperature of the coagulating system in which mixing of the latex with the aqueous electrolyte solution is taking place, the stirring conditions imparted to the coagulating system and the like should be appropriately determined.

Examples of electrolytes used as the coagulating agent in the present invention are, for example: inorganic salts such as sodium chloride, potassium chloride, calcium chloride, magnesium chloride, sodium sulfate, calcium sulfate, aluminum sulfate, and potassium alum; inorganic acids such as hydrochloric acid, sulfuric acid, phosphoric acid and nitric acid; organic acids such as acetic acid, tartaric acid, and acrylic acid; and organic salts such as sodium acetate, calcium acetate, potassium formate and calcium formate. These electrolytes are used in the form of an aqueous solution of one or more thereof.

The concentration of the aqueous electrolyte solution as the coagulating agent according to the present invention is adjusted to such a level as to provide a slow coagulation rate at which the graft copolymer latex is granulated into substantially spherical particles. The pH or salt concentration of the coagulation system may be maintained at a pH or concentration capable of causing the slow coagulation. More specifically, the pH or salt concentration range as described hereinafter is preferably used. The term "pH or salt concentration range of the coagulation system" refers to the pH or salt concentration of the latex undergoing coagulation, i.e., a mixture of the latex and the aqueous acid or salt solution during the coagulation. These conditions should be substantially maintained within the ranges described hereinafter.

In the case where the aqueous coagulation agent solution is an aqueous solution of inorganic or organic acids, the pH of the coagulation system is preferably controlled to a range of from 2.0 to 6.0 more preferably 2.2 to 5.4. If the pH of the coagulation system is less than 2.0, the coagulation rate is too fast to attain the objects of the present invention. On the other hand, if the pH of the coagulation system is more than 6.0, the coagulation rate is too slow to prevent the formation of coarse particles. In the case where the aqueous coagulating agent solution is an aqueous solution of salts, the concentration in the coagulation system is variable depending upon the valence of the cation. A preferable concentration to provide the slow coagulation is in the range of from 0.08 to 0.5 mole/liter, preferably from 0.1 to 0.4 mole/liter, for monovalent ions such as sodium and potassium, from 0.004 to 0.04 mole/liter, preferably from 0.009 to 0.035 mole/liter, for divalent ions such as calcium and magnesium, and from 0.0008 to 0.009 mole/liter, preferably from 0.001 to 0.0075 mole/liter, for trivalent ions such as aluminum.

If desired, the acids and the salts may be used in combination. In this case, concentrations at which the slow coagulation occurs are selected.

The mixing proportions of the graft copolymer latex and the aqueous coagulating agent solution are preferably such that the slurry concentration after the coagulation is in the range of from 5% to 20%, from the viewpoint of attaining smooth granulation. If the slurry concentration is less than 5%, it is too low to attain uniform coalescence and fusion between the fine particles. If the slurry concentration is higher than 20%, the viscosity of the coagulation system will be excessively high, whereby the coalescence and fusion of the fine particles similarly will become uneven.

The method for mixing the graft copolymer latex and the aqueous coagulating agent solution to carry out the slow coagulation may be optionally selected. That is, the latex may be added to the aqueous coagulating agent solution, or vice versa the aqueous coagulating agent solution may be added to the latex. A method in which the latex and the aqueous coagulating agent solution are caused to flow simultaneously to the coagulating vessel may be used. Furthermore, when the latex is added to the aqueous coagulating agent solution, a coagulating agent having an appropriate pH or concentration can be simultaneously added so as to maintain the coagulation system in the mild coagulation range. The temperature of the coagulation system, together with the concentration of the aqueous coagulating agent solution, is an important factor for controlling coalescence of the fine particles into larger particles so as to obtain substantially spherical particles. Although the temperature of the coagulation system is selected according to the desired particle diameter and particle size distribution, it is preferably in the range of the minimum film-forming temperature plus and minus 30° C. The coagulation is carried out under stirring at a stirring rate at which rapid mixing of the aqueous granulating agent solution and the latex occurs.

Post-treatment

In accordance with the present invention, only the slow coagulation can produce substantially spherical particles. However, the slow coagulation alone may be accompanied by the occurrence of a slight amount of the non-coagulated latex which is unfavorable in the light of the generation of fine powder and environmental sanitation. In this case, it is preferable that after the slow coagulation, a coagulating agent be further used to cause a second stage coagulation, thereby completing the coagulation. In the second stage of coagulation, acids or salts are added after the completion of the slow coagulation. When acids are added, the pH of the coagulation system is preferably 1.8 or less. In the case where salts are added, it is preferable that the salt concentration of the coagulation system be 0.8 mole/liter or more for monovalent cations, 0.05 mole/liter or more for divalent cations, and 0.01 mile/liter or more for trivalent cations.

After the slow coagulation or the second stage coagulation, it is preferable that the slurry be neutralized with acids such as hydrochloric acid when the slurry is alkaline and with alkalis such as sodium hydroxide when the slurry is acidic and then be heat treated at a temperature of 50° to 100° C. Thereafter, dewatering and drying are carried out in a conventional manner to obtain the graft copolymer powder.

Experimental Examples

The following examples and comparative examples are intended to illustrate the present invention.

The methods for determining the powder characteristics used in the Examples and Comparative Examples are collectively shown in Table 1.

The water content of the wet cake is represented on a dry powder basis. The powder characteristics are the values determined on the powder dried at a drying temperature of 60° C. overnight.

TABLE 1

| Method for Determining Powder Characteristics | |
|---|---|
| Evaluation Item | Evaluation Method and Condition |
| Fluidity | 50 g of resin powder is placed in a bulk density measuring instrument specified in JIS (Japanese Industrial Standard)-K-6721. Thereafter, the damper is removed to determine the time required for the powder to flow out (unit: sec/50 g). |
| Blocking resistance (Tablet hardness) | 0.5 g of resin powder is placed in a tablet press and a pressure of 5 kg/cm$^2$ is applied to the powder for one minute to form a tablet having a sectional area of 1 cm$^2$. The minimum load necessary to break this tablet is determined by using a Kiya type hardness meter (unit: kg/cm$^2$). |
| Bulk density | The bulk eensity is determined according to JIS-K-6721. 50 g of the sample is used (unit: g/dl). |
| Particle size distribution | A sieve specified in ASTM-EH70 is used and external vibration is applied for 10 minutes by electro-magnetic vibration, after which the distribution on the sieve is determined. 20 g of the sample is used and 0.2 g of carbon black is added for antistatic purposes (unit: % by weight). Average particle diameter $d_{50}$: a particle diameter of the 50% cumulative value determined from the cumulative distribution curve of the |

TABLE 1-continued

| Method for Determining Powder Characteristics | |
|---|---|
| Evaluation Item | Evaluation Method and Condition |
| | particle size distribution. Dispersion $d_{50}/d_{84}$: the magnification of the average particle diameter $d_{50}$ to the particle diameter $d_{84}$ of the 84% cumulative value. |

EXAMPLE 1

An autoclave provided with a stirrer was charged with 0.06 parts of diisopropylbenzene hydroperoxide, a monomer mixture consisting of 50 parts of butadiene and 15 parts of styrene and containing 0.65 parts of divinylbenzene, 150 parts of distilled water containing 0.11 parts of sodium pyrophosphate, 0.002 parts of ferrous sulfate, 0.003 parts of disodium ethylenediaminetetraacetate, 0.03 parts of formaldehyde sodium sulfoxylate and 0.75 parts of potassium oleate. The contents of the autoclave were maintained at a temperature of 60° C. for 13 hours to complete the polymerization.

The resultant rubbery polymer latex having an average particle diameter of 0.1 μm was mixed with 8.065 parts of dioctyl sodium sulfosuccinate and then with 30 parts of an aqueous 0.2% hydrochloric acid solution to cause coagulation, thereby obtaining a rubbery polymer latex having an average particle diameter of 0.15 μm.

To 265 parts (solid content: 70 parts) of this latex were added 0.02 parts of diisopropylbenzene hydroperoxide, a monomer mixture consisting of 10 parts of styrene and 12.5 parts of methyl methacrylate and containing 0.1 parts of divinylbenzene, and 0.02 parts of formaldehyde sodium sulfoxylate. Thereafter, the mixture was polymerized at a temperature of 60° C. for 3 hours. 0.008 parts of diisopropylbenzene hydroperoxide, a mixed monomer consisting of 5.0 parts of methyl methacrylate and 2.5 parts of ethylacrylate and containing 0.04 parts of divinylbenzene, and 0.008 parts of formaldehyde sodium sulfoxylate were further added to the resultant reaction mixture. This mixture was further polymerized at 60° C. for 5 hours to obtain a graft copolymer latex (solid content: 100 parts). The minimum film-forming temperature and pH of the latex were 49° C. and 8.0, respectively.

295 parts (solid content: 100 parts) of the graft copolymer latex thus obtained was gradually added, under stirring, to a coagulation vessel containing 500 parts of an aqueous hydrochloric acid solution heated to 50° C. and having a pH of 3.5. In this case, the pH of the coagulation system was controlled to 3.5 until the completion of the latex addition by adding an aqueous 0.2% hydrochloric acid solution in parallel to the latex addition.

At the initial stage of the latex addition, the coagulation system comprised an emulsion comprising fine coagulated particles and the non-coagulated latex. As the latex addition was further continued, the coagulation system became viscous, and particles appeared. These particles were substantially in the form of spheres.

After the completion of the latex addition, the coagulation system was cloudy due to the presence of a slight amount of the residual non-coagulated latex. The pH of the coagulation system was adjusted to 1.5 with an aqueous 0.7% hydrochloric acid solution to complete the coagulation. During the second stage of coagulation, the coagulation system was maintained at a temperature of 50° C. Thereafter, the resultant slurry was neutralized with a 2% aqueous sodium hydroxide solution, heat treated at 90° C., dewatered and dried. Thus, a powder was obtained.

The resultant powder was in the form of substantially spherical particles with very little fine powder and exhibited excellent fluidity. A photomicrograph of the thus obtained particles is shown in FIG. 1. The results of determination for powder characteristics are as shown in Table 2.

COMPARATIVE EXAMPLE 1

The graft copolymer latex (solid content: 100 parts) obtained in Example 1 was gradually added, with stirring, to 500 parts of an aqueous 0.2% hydrochloric acid solution heated to 50° C. and having a pH of 1.3 to coagulate the latex. After the completion of the latex addition, the slurry pH was 1.6.

Figure 2:
FIG. 2 is a similar photomicrograph of irregular particles of a similar graft copolymer coagulated according to the conventional process of Comparative Example 1 presented hereinafter.

Thereafter, the slurry was neutralized and powder was recovered as described in Example 1. The resultant powder consisted of irregular particles, exhibited no fluidity and contained a large amount of very fine particles. A photomicrograph of the powder is shown in FIG. 2. The results of determination for powder characteristics are as shown in Table 2.

EXAMPLES 2 and 3, and COMPARATIVE EXAMPLE 2

When the graft copolymer latex (solid content: 100 parts) obtained in Example 1 was coagulated with 500 parts of an aqueous hydrochloric acid solution at 50° C., a method comprising adding the latex to an aqueous hydrochloric acid solution having concentrations of 0.013% (Example 2), 0.025% (Example 3) and 0.00625% (Comparative Example 2), respectively, was used. The pHs of the aqueous hydrochloric acid solution were 2.4, 2.2 and 2.7, respectively. After the completion of the latex addition, the slurry pHs were measured and found to be pH 5.4 (Example 2), pH 4.2 (Example 3) and pH 7.5 (Comparative Example 2), respectively. Thereafter, powder was recovered in the same manner as that described in Example 1.

In the case where the coagulation was carried out with the use of the hydrochloric acid concentrations of 0.01% and 0.025% and the pH of the coagulation system was varied within the range of from 2.0 to 6.0, the powder particles were all of substantially spherical form. However, when the pH of the latex coagulating system was more than 6.0, the coagulation was unsatisfactory and a large proportion of the latex remained uncoagulated. When the uncoagulated latex was subsequently coagulated with a 0.7% aqueous hydrochloric acid solution, the powder particles became massive. At the same time, very fine particles were produced in a large amount, and the particle shape was irregular. The measurement results of the powder characteristics are as shown in Table 2.

EXAMPLES 4 THROUGH 8 AND COMPARATIVE EXAMPLE 3

As an example illustrating the effect of a minimum film-forming temperature on a graft copolymer latex, Examples 4 through 8 and Comparative Example 3 wherein the same polymerization procedure as in Example 1 was conducted are shown in Table 3. In Examples 4 and 5, the content of the rubbery backbone polymer constituting the graft copolymer was changed. In Examples 6 through 8, introduction of ethylarrylate into the monomers constituting the hard polymer was carried out to change the minimum film-forming temperature of the latex with the content of the rubbery backbone polymer being maintained constant.

The latex was subjected to slow coagulation as described in Example 1 to recover powder. The temperatures of the coagulation system during the coagulation operation were 70° C. for Example 4, 35° C. for Example 5, 70° C. for Example 6, 50° C. for Example 7, 30° C. for Example 8, and 80° C. for Comparative Example 3. The resultant powders were all in the form of substantially spherical particles. In the case where the minimum film-forming temperature of the latex was 70° C. or less, the water content of the wet cake before drying was 120% or less, and the bulk density of the dried powder was more than 30 g/dl. On the other hand, in Comparative Example 3 in which the minimum film-forming temperature was 80° C. or more, the dried powder consisted of substantially spherical particles and exhibited spontaneous fluidity. However, the water content of the wet cake was as high as 180% and the bulk density was 23 g/dl, indicating that fusion of the fine particles with each other was unsatisfactory.

EXAMPLE 9

The same latex (solid content: 100 parts) as that obtained in Example 1 was subjected to slow coagulation at a temperature of 50° C. by using 500 parts of an aqueous acetic acid solution adjusted to a pH value of 3.5. In this case, the pH of the coagulation system was constantly maintained at 3.5 by adding an aqueous 1% acetic acid solution in parallel with the latex addition. After the slow coagulation, the slurry was cloudy due to the presence of a slight amount of the non-coagulated latex. This slurry was adjusted to a pH value of 1.6 by addition of an aqueous 5% acetic acid solution thereto, thereby completing the coagulation. Thereafter, the same procedure as that described in Example 1 was carried out. Thus, the same powder as in Example 1 could be obtained. The results of measurement of the powder characteristics are shown in Table 2.

EXAMPLE 10

The same latex (solid content: 100 parts) as that obtained in Example 1 was subjected to slow coagulation at a temperature of 50° C. with the use of 500 parts of an aqueous calcium chloride solution having a concentration of 0.014 mole/liter. The calcium ion concentration in the coagulation system became 0.01 mole/liter and the slurry pH after the slow coagulation was 7.4. The slurry contained a slight amount of the non-coagulated latex and was cloudy. This slurry was adjusted to a pH of 1.8 by addition of an aqueous 0.7% phosphoric acid solution thereto, thereby completing the coagulation. Thereafter, the same powder as in Example 1 could be obtained by carrying out the same procedures as these described in Example 1. The results of measurement of the powder characteristics are shown in Table 2.

COMPARATIVE EXAMPLE 4

Powder was obtained according to the same procedure as in Example 10 except that 500 parts of an aqueous calcium chloride solution having a concentration of 0.09 mole/liter was used. The calcium ion concentration in the coagulation system became 0.065 mole/liter. The slurry pH after the slow coagulation was 7.4 as in Example 10, but the slurry contained no non-coagulated latex. The resultant powder was irregular in shape and exhibited no fluidity. The measurement results of the powder characteristics are as shown in Table 2.

COMPARATIVE EXAMPLE 5

Powder was obtained according to the same procedure as in Example 10 except that 500 parts of an aqueous calcium chloride solution having a concentration of 0.004 mole/liter was used. The calcium ion concentration in the coagulation system became 0.0029 mole/liter, but at this concentration, the latex was not coagulated at all, and the objects of the present invention could not be attained.

EXAMPLE 11

The same latex (solid content: 100 parts) as that obtained in Example 1 was subjected to slow coagulation at a temperature of 50° C. with the use of 500 parts of an aqueous aluminum sulfate having a concentration of 0.003 mole/liter. The Al ion concentration in the coagulation system became 0.0022 mole/liter. After the slow coagulation, the slurry pH was 6.5, and the slurry contained no non-coagulated latex. Thereafter, the same operation as in Example 1 was conducted to recover the powder. The resultant powder was the same as that obtained in Example 1. The measurement results of the powder characteristics are shown in Table 2.

COMPARATIVE EXAMPLE 6

Powder was obtained by conducting the same latex coagulating operation as that described in Example 11 except that the concentration of the aqueous aluminum sulfate solution was changed to 0.013 mole/liter. The Al ion concentration in the coagulation system became 0.0094 mole/liter. The resultant powder was irregular in shape and exhibited no fluidity. The results of measurement of the powder characteristics are shown in Table 2.

COMPARATIVE EXAMPLE 7

Slow coagulation was conducted in accordance with the same operation as that described in Example 11 except that the concentration of the aqueous aluminum sulfate solution was changed to 0.0008 mole/liter. The aluminum ion concentration in the coagulation system was 0.00058 mole/liter. At this concentration, the latex was not slow coagulated at all, and the objects of the present invention could not be obtained.

EXAMPLE 12

The same latex (solid content: 100 parts) as obtained in Example 1 was subjected to slow coagulation at a temperature of 50° C. with the use of 500 parts of an aqueous sodium chloride solution having a concentration of 0.3 mole/liter. The sodium ion concentration in the coagulation system was 0.22 mole/liter. After the slow coagulation, the slurry pH was 7.2. The slow coagulation slurry was slightly cloudy. This slurry was adjusted to a pH value of 1.8 by the addition thereto of an aqueous 0.7% phosphoric acid solution, thereby completing the coagulation. Thereafter, the same operation as that described in Example 1 was carried out. Thus, the same powder as that described in Example 1 was obtained. The measurement results of the powder characteristics are as shown in Table 2.

COMPARATIVE EXAMPLE 8

Powder was obtained according to the same procedure as in Example 12 except that the concentration of the aqueous sodium chloride solution was changed to 0.85 mole/liter. The sodium ion concentration in the coagulation system became 0.61 mole/liter. The resultant powder was irregular in shape and exhibited no fluidity. The measurement results of the powder characteristics are as shown in Table 2.

COMPARATIVE EXAMPLE 9

The same slow coagulation operation as that described in Example 12 was repeated except that the concentration of the aqueous sodium chloride solution was changed to 0.07 mole/liter. The sodium ion concentration in the coagulation system became 0.05 mole/liter, at which level the latex was not slow-coagulated at all, and the objects of the present invention could not be attained.

EXAMPLE 13

An autoclave provided with a stirrer was charged with 0.06 parts of diisopropylbenzene hydroperoxide, a monomer mixture consisting of 50 parts of 2-ethylhexyl acrylate and 15 parts of butadiene and containing 0.65 parts of ethyleneglycol dimethacrylate, and 180 parts of distilled water containing 0.1 parts of sodium pyrophosphate, 0.002 parts of ferrous sulfate, 0.003 parts of sodium ethylenediaminetetraacetate, 0.06 parts of formaldehyde sodium sulfoxylate and 0.75 parts of potassium oleate. After the gaseous atmosphere within the system was thoroughly replaced with nitrogen, the mixture was maintained at a temperature of 50° C. for 16 hours to complete the polymerization. To the resultant rubbery backbone polymer latex were added 0.06 parts of dioctyl sodium sulfosuccinate and then 35 parts of an aqueous 0.2% hydrochloric acid solution to obtain a rubbery backbone polymer in which the latex average particle diameter was coagulated to $0.16\mu$.

To this latex (solid content: 65 parts) were added 0.02 parts of diisopropylbenzene hydroperoxide, a monomer mixture consisting of 11 parts of styrene, 4 parts of acrylonitrile and 5 parts of methyl methacrylate and containing 0.15 parts of ethylene glycol dimethacrylate and 0.01 parts of formaldehyde sodium sulfoxylate. The mixture was polymerized at a temperature of 60° C. for 3 hours. Thereafter, 0.010 parts of diisopropylbenzene hydroperoxide, 10.5 parts of methyl methacrylate containing 0.1 parts of ethylene glycol dimethacrylate, 4.5 parts of butyl acrylate and 0.01 parts of formaldehyde sodium sulfoxylate were added to the resultant mixture. The mixture was polymerized at a temperature of 60° C. for 5 hours to obtain a graft copolymer latex containing acrylic rubber. The resultant latex had a minimum film-forming temperature of 61° C. and a pH of 7.6.

The resultant acrylic rubber-containing graft copolymer latex (solid content: 100 parts) was gradually added, while stirring was conducted to a coagulating vessel containing 300 parts of an aqueous hydrochloric acid solution heated to 65° C. and having a pH of 2.5 so as to allow the latex to be slow-coagulated. In this case, the pH of the coagulation system was controlled at 2.5 until the completion of the latex addition by adding an aqueous 0.2% hydrochloric acid solution in parallel with the latex addition. Thereafter, the powder was recovered according to the same operation as that described in Example 1. The coagulation process was the same as in Example 1, and the resultant powder was in the form of substantially spherical particles. The results of measurement of the powder characteristics are as shown in Table 2.

EXAMPLE 14

The same latex (solid content: 100 parts) as that obtained in Example 13 was subjected to slow coagulation with the use of 450 parts of an aqueous potassium formate solution having a concentration of 0.25 mole/liter. The potassium ion concentration in the coagulation system became 0.17 mole/liter. After the slow coagulation, the slurry contained a slight amount of the non-coagulated latex and was cloudy. The slurry was adjusted to a pH of 1.8 by addition of an aqueous 0.7% hydrochloric acid solution thereto, thereby completing the coagulation. Thereafter, powder consisting of substantially spherical particles was obtained by carrying out the same operation as that described in Example 13. The results of measurement of the powder characteristics are shown in Table 2.

EXAMPLE 15

The same latex (solid content: 100 parts) as that obtained in Example 13 was subjected to slow coagulation with the use of 450 parts of an aqueous calcium primary phosphate having a concentration of 0.015 mole/liter. The calcium ion concentration in the coagulation system became 0.010 mole/liter. After the slow coagulation, the slurry contained a slight amount of the non-coagulated latex and was cloudy. This slurry was adjusted to a pH of 1.8 by addition of an aqueous 0.7% hydrochloric acid solution thereto, thereby completing the coagulation. Thereafter, powder consisting of substantially spherical particles was obtained by carrying out the same operation as that described in Example 13. The results of measurement of the powder characteristics are shown in Table 2.

EXAMPLE 16

The graft copolymer latex used in Example 1 was subjected to a continuous processing through five stainless steel stirring vessels provided with jackets and arranged in series, wherein the slow coagulation was carried out in the first vessel, the treatment of the non-coagulated latex was carried out in the second vessel, the neutralization was carried out in the third vessel, and the heat treatment was carried out in the fourth and fifth vessels. Each vessel had a volume of 3 liters, 20 liters/hr of the latex and 30 liters/hr of an aqueous 0.025% hydrochloric acid solution were passed into the first vessel at separate inlets thereof. 10 liters/hr of an aqueous 1.7% hydrochloric acid solution was supplied into the second vessel, and the neutralization and heat treatment of the slurry were carried out in the third vessel and the following vessels, respectively.

The temperature of each vessel was so controlled that the first through third vessels had a temperature of 50° C. and the fourth and fifth vessels had a temperature of 90° C. The stirring speed was 400 rpm for each vessel. The slurry which had undergone the slow coagulation in the first vessel consisted essentially of, as the solid matter, substantially spherical particles and had a pH of 4.2. This slurry was slightly cloudy. However, at the outlet of the second vessel, the non-coagulated late had been completely treated. The slurry emerging from the outlet of the second vessel had a pH of 1.6. The wet cake obtained by dewatering the heat treated slurry had a water content of 88%. The dried powder was completely free from dust and exhibited a flow speed of 17 sec/50 g and a bulk density of 36 g/dl. The results of measurement of the powder characteristics are shown in Table 2.

TABLE 2

| | Water content of wet cake (%) | Flow speed (sec/50 g) | Bulk density (g/dl) | Tablet hardness (kg/cm$^2$) | Particle size distribution | | | Shape of particle |
|---|---|---|---|---|---|---|---|---|
| | | | | | Average particle diameter $d_{50}$ ($\mu$) | Dispersion $d_{50}/d_{84}$ | 44$\mu$ or less (%) | |
| Example | | | | | | | | |
| 1 | 96 | 16 | 36 | 0.1 | 245 | 1.4 | 1.8 | substantial sphere |
| 2 | 108 | 21 | 32 | 0.2 | 225 | 1.5 | 0.8 | substantial sphere |
| 3 | 97 | 19 | 34 | 0.1 | 244 | 1.5 | 1.4 | substantial sphere |
| 9 | 96 | 16 | 37 | 0.1 | 253 | 1.5 | 1.8 | substantial sphere |
| 10 | 93 | 16 | 38 | 0.1 | 240 | 1.5 | 1.6 | substantial sphere |
| 11 | 93 | 16 | 38 | 0.1 | 234 | 1.4 | 1.6 | substantial sphere |
| 12 | 96 | 18 | 33 | 0.2 | 236 | 1.5 | 1.2 | substantial sphere |
| 13 | 110 | 18 | 35 | 0.1 | 228 | 1.6 | 1.5 | substantial sphere |
| 14 | 116 | 20 | 31 | 0.2 | 232 | 1.6 | 1.3 | substantial sphere |
| 15 | 120 | 18 | 34 | 0.1 | 225 | 1.5 | 1.6 | substantial sphere |
| 16 | 88 | 17 | 36 | 0.1 | 286 | 1.4 | 1.8 | substantial sphere |
| Comparative Example | | | | | | | | |
| 1 | 45 | not flow | 25 | 0.9 | 185 | 3.1 | 16 | Irregular |
| 2 | 75 | 32 | 26 | 0.3 | 225 | 2.1 | 5.5 | Irregular |
| 4 | 44 | not flow | 23 | 0.9 | 180 | 2.8 | 13 | Irregular |
| 6 | 44 | not | 25 | 0.8 | 187 | 2.6 | 12 | Irregular |

TABLE 2-continued

| | Water content of wet cake (%) | Flow speed (sec/50 g) | Bulk density (g/dl) | Tablet hardness (kg/cm$^2$) | Particle size distribution | | | Shape of particle |
|---|---|---|---|---|---|---|---|---|
| | | | | | Average particle diameter $d_{50}$ ($\mu$) | Dispersion $d_{50}/d_{84}$ | 44$\mu$ or less (%) | |
| 8 | 42 | flow not flow | 25 | 0.9 | 198 | 2.4 | 8 | Irregular |

TABLE 3

| | Composition of graft copolymer (part) | | | | | | | Minimum film-forming temp. of latex (°C.) | Water content of wet cake (%) | Flow speed (sec/50 g) | Bulk density (g/dl) | Tablet hardness (kg/cm$^2$) | Particle size distribution 44$\mu$ or less (%) | Shape of particle |
|---|---|---|---|---|---|---|---|---|---|---|---|---|---|---|
| | Rubbery backbone polymer | | | Hard graft polymer | | | | | | | | | | |
| | But | St | DVB | St | MMA | Ea | DVB | | | | | | | |
| Example | | | | | | | | | | | | | | |
| 4 | 57.7 | 17.3 | 0.75 | 11.0 | 14 | 0 | 0.097 | 60 | 105 | 20 | 34 | 0.2 | 1.8 | substantial sphere |
| 5 | 61.6 | 18.4 | 0.80 | 7.9 | 12.1 | 0 | 0.08 | 28 | 84 | 16 | 38 | 0.1 | 1.4 | substantial sphere |
| 6 | 50 | 15 | 0.65 | 17.3 | 16.2 | 1.5 | 0.131 | 65 | 118 | 22 | 33 | 0.3 | 2.2 | substantial sphere |
| 7 | 50 | 15 | 0.65 | 17.3 | 14.7 | 3 | 0.131 | 40 | 86 | 16 | 37 | 0.3 | 1.8 | substantial sphere |
| 8 | 50 | 15 | 0.65 | 17.3 | 13.2 | 4.5 | 0.131 | 19 | 76 | 17 | 36 | 0.3 | 1.7 | substantial sphere |
| Comparative Example | | | | | | | | | | | | | | |
| 3 | 38.5 | 11.5 | 0.5 | 26.8 | 23.2 | 0 | 0.178 | 80 or more | 180 | 33 | 23 | 0.3 | 2.2 | substantial sphere |

But: Butadiene
St: Styrene
MMA: Methyl methacrylate
EA: Ethylacrylate
DVB: Divinylbenzene

What is claimed is:

1. A process for producing a rubber-based graft copolymer, which comprises contacting a latex of a graft copolymer which has been obtained by emulsion polymerizing 40% to 10% by weight of a hard polymer-forming monomer in the presence of a latex of 60 to 90% of a rubbery polymer and having a minimum film-forming temperature no higher than 65° C., with an aqueous electrolyte solution consisting essentially of water and an electrolyte, under stirring, thereby to coagulate the latex, and recovering the precipitated graft copolymer, characterized in that said graft copolymer latex is subjected to slow coagulation so as to allow said graft copolymer to precipitate as substantially spherical particles, wherein the term slow coagulation refers to coagulation which proceeds at a milder rate than that of coagulation in which the aqueous electrolyte solution is hydrochloric acid and the pH of the latex during coagulation is 1.8 or lower.

2. A process as claimed in claim 1, wherein said slow coagulation is carried out under the conditions:

(a) the aqueous electrolyte solution is an aqueous solution of an organic or inorganic acid; and
   (b) the pH of the latex during coagulation is in the range of from 2.0 to 6.0.

3. A process as claimed in claim 1, wherein said slow coagulation is carried out under the following conditions:

(a) the aqueous electrolyte solution is an aqueous solution of an inorganic or organic salt having a cation selected from mono-, di- and tri-valent cations; and
   (b) the concentration of said salt in the latex during coagulation is 0.08 to 0.5 mole/liter for a monovalent cation, 0.004 to 0.04 mole/liter for a di-valent cation, and 0.0008 to 0.009 mole/liter for a tri-valent cation.

4. A process as claimed in claim 1, wherein stronger coagulation conditions than those of said slow coagulation are applied to the latex which has undergone the slow coagulation to complete the coagulation.

5. A process as claimed in claim 1 in which the film-forming temperature of the latex of the rubbery polymer has a film-forming temperature of 61° C.

* * * * *